(12) United States Patent
Madou et al.

(10) Patent No.: US 10,318,728 B2
(45) Date of Patent: Jun. 11, 2019

(54) DETERMINING PERMISSIBLE ACTIVITY BASED ON PERMISSIBLE ACTIVITY RULES

(71) Applicant: HEWLETT PACKARD ENTERPRISE DEVELOPMENT LP, Houston, TX (US)

(72) Inventors: Matias Madou, Diegem (BE); Benjamin Seth Heilers, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 158 days.

(21) Appl. No.: 15/500,528

(22) PCT Filed: Dec. 16, 2014

(86) PCT No.: PCT/US2014/070594
§ 371 (c)(1),
(2) Date: Jan. 31, 2017

(87) PCT Pub. No.: WO2016/099458
PCT Pub. Date: Jun. 23, 2016

(65) Prior Publication Data
US 2017/0220798 A1    Aug. 3, 2017

(51) Int. Cl.
*H04L 29/06*  (2006.01)
*G06F 21/55*  (2013.01)
*G06F 21/62*  (2013.01)
*G06F 21/53*  (2013.01)

(52) U.S. Cl.
CPC ............ *G06F 21/552* (2013.01); *G06F 21/53* (2013.01); *G06F 21/554* (2013.01); *G06F 21/6227* (2013.01); *G06F 2221/034* (2013.01)

(58) Field of Classification Search
CPC ...... G06F 21/552; G06F 21/53; G06F 21/554; G06F 21/6227; G06F 2221/034
See application file for complete search history.

(56) References Cited

U.S. PATENT DOCUMENTS

| 7,792,770 | B1 |  | 9/2010 | Phoha et al. |
| 9,438,617 | B2 | * | 9/2016 | Mendelev ............ G06F 11/3672 |
| 9,501,650 | B2 | * | 11/2016 | Chess .................... G06F 21/577 |
| 2004/0243881 | A1 | * | 12/2004 | Wang ...................... G06F 21/53 714/37 |

(Continued)

FOREIGN PATENT DOCUMENTS

EP      2320316 A1    5/2011
JP   2001519942 A   10/2001
(Continued)

OTHER PUBLICATIONS

Chandola, Varun, et al. "Anomaly detection: A survey." ACM Computing Surveys (CSUR) 41.3, Sep. 2009, 72 pages.
(Continued)

*Primary Examiner* — Sarah Su (57) ABSTRACT

Example embodiments disclosed herein relate to determining permissible activity in an application. Application programming interfaces (APIs) of an application are monitored using a runtime agent. Information about the APIs is provided to a rules engine. A set of rules describing permissible activity is received from the rules engine.

15 Claims, 3 Drawing Sheets

(56) References Cited

U.S. PATENT DOCUMENTS

| | | | |
|---|---|---|---|
| 2011/0167493 A1 | 7/2011 | Song et al. | |
| 2011/0320984 A1 | 12/2011 | Irani | |
| 2012/0066620 A1 | 3/2012 | Gang et al. | |
| 2013/0339285 A1 | 12/2013 | Dresdner et al. | |
| 2014/0047544 A1 | 2/2014 | Jakobsson | |
| 2014/0115652 A1 | 4/2014 | Kapoor | |
| 2014/0215618 A1 | 7/2014 | Striem Amit | |
| 2017/0099292 A1* | 4/2017 | Kelley | H04L 63/10 |
| 2017/0220798 A1* | 8/2017 | Madou | G06F 21/552 |
| 2018/0367299 A1* | 12/2018 | Schutz | G06F 21/552 |

FOREIGN PATENT DOCUMENTS

| | | |
|---|---|---|
| JP | 2007306186 A | 11/2007 |
| JP | 2008-547067 | 12/2008 |
| JP | 201002174 B2 | 4/2010 |
| JP | 2012088803 A | 5/2012 |
| JP | 2012221499 A | 11/2012 |
| JP | 2012234336 B2 | 11/2012 |
| WO | WO-2012110501 A1 | 8/2012 |
| WO | WO-2013055711 A2 | 4/2013 |

OTHER PUBLICATIONS

Hua. Liu, et al. "DIOS++: A Framework for Rule-Based Autonomic Management of Distributed Scientific Applications", Rutgers University, New Jersy, USA, 2003, 8 pages.

Lima, Moisés F., et al. "Anomaly detection using baseline and K-means Clustering", Sep. 23-25, 2010 International Conference IEEE, 5 pages.

Wang, Ling, et al. "A Modified K-Means Clustering with a Density-Sensitive Distance Metric" Institute of Intelligent Information Processing, Apr. 22, 2006, 8 pages.

Search Report & Written Opinion for PCT Application No. PCT/US2014/070594, dated Jul. 21, 2015, 7 pages.

Ben Kamens: Breaking down Amazon's mega dropdown: Mar. 6, 2013 (Mar. 6, 2013), Retrieved from the Internet: URL:http://bjk5.com/post/44698559168/breaking-down-amazons-mega-dropdown; [retrieved on Apr. 23, 2018] (9 pages).

European Patent Office, Extended European Search Report for Appl No. 14907562.4-1221/3227768: PCT/CN2014/093088 dated Jun. 11, 2018 (16 pages).

* cited by examiner

DETERMINING PERMISSIBLE ACTIVITY BASED ON PERMISSIBLE ACTIVITY RULES

BACKGROUND

Software security testing is used to identify vulnerabilities in an application such as a Web application. Applications are a popular target for attackers. Network security and security testing offer some defense, but these types of testing can miss some malicious activity (e.g., some zero day attacks).

BRIEF DESCRIPTION OF THE DRAWINGS

The following detailed description references the drawings, wherein.

DETAILED DESCRIPTION

Web applications are software that run in web browsers. Access is provided by web application servers. Web applications have become popular due to the popularity of web browsers, which can be used as clients for the applications. However, web applications are the target of various attacks.

As the number and complexity of enterprise applications grows, the attack surface for exploits increases, leaving enterprises exposed. Traditional methods of protecting applications can take significant time to implement and are focused on software that is in development. These protections do not protect applications running in production. Additionally, with a majority of successful breaches occurring at the application layer, it is clear that installing simple perimeter defense to protect production software lacks effectiveness.

Runtime application self-protection (RASP) solutions as well as Web Application Firewalls (WAF)'s suffer from the time it takes to manually fine-tune the solution to protect against the attacks and let normal user traffic go through. Manual fine-tuning adds a significant amount of overhead to the solution, as well as making the solution prone to human errors. Making such errors may lead to blocking people from using the solution, or vice-versa, by letting an attack go through and, as such, being breached.

Accordingly, various embodiments herein describe an approach to prevent attacks from within an application while reducing the need to manually fine tune the approach. Runtime analysis technology is used to monitor activity in the runtime environment to detect and prevent real-time attacks. Fine tuning the RASP solution takes into account characterizing what bad traffic is, and what good traffic is. As there are known attack vectors, the RASP solution can start by incorporating these known attack vectors (blacklisting). However, not all bad attack vectors are known today, so a more robust solution would be to characterize the good traffic (whitelisting). This can be performed in addition to other security mechanisms or on its own. A challenge to this approach is that good traffic tends to be different from application to application. A security analyst can, in a manual attempt, try to characterize good traffic and the analyst will normally do that by looking at what tends to come by in a normal situation.

Automating this can be done by characterizing the good traffic based on training data. To do this, machine learning can be used. In particular, k-means clustering can be used in conjunction with density estimation. When a large enough sample set if provided and the data converges, k clusters will be available which can be used to check incoming traffic against. K-means clustering is an approach for vector quantization that allows for modeling of probability density functions by distribution of prototype vectors. The k-means clustering approach lends itself to partitioning n observations, which in this case would be normal use of an application, into k clusters of like behavior. Here, the each observation belongs to the cluster with the nearest "mean."

The observations can be from Application Programming Interfaces (APIs) monitored by a runtime agent running on one or more servers including the web application. In some examples, the application can be implemented such that the application is installed on multiple servers and a load balancer can be used to provide balance loads between servers running the application. APIs that perform an action that may be a target for attackers can be monitored for observations. Examples of APIs to look at for observations include APIs that call perform queries, APIs that cause something to be rendered at a web browser, etc.

In one example, a vulnerability to protect against is Structured Query Language (SQL) injection. In this example, each query that is executed against a database can be recorded and when enough training data is available, the data is processed through a clustering algorithm. In the example of a k-means clustering approach, the end result of the clustering algorithm will be k clusters containing the training data.

Once the clusters are available, density estimation can be used to generate rules that can be used on incoming traffic to the application to find anomalies. For this given example, each query that will be executed against the database will first be checked to see if this is an anomaly or not. If it is, a default action can be taken to protect the application from letting an anomalous query being executed against the database. As described herein, information about queries as well as other APIs can be used to help determine whether actions are anomalous to help protect the application.

As noted, the solution is based on the fact that normal traffic has certain characteristics and normal traffic is the majority of the requests that come in. Attacks on the other hand will generally appear infrequently and will have different characteristics than normal traffic.

This solution can be used for a variety of possible application vulnerabilities such as SQL injection, Cross-site scripting (XSS), command injection, etc. As it works on the API's in the application itself, the runtime agent can provide additional context for generating the rules than use of a WAF.

As described herein, a software program referred to herein as a runtime agent is used to watch the internal operations performed by the application. The software can be executed by hardware. The runtime agent can determine the operation of the application and how it behaves and provide this information to a rules engine. The runtime agent also allows for checking future API calls to rules received from the rules engine.

Figure 1:
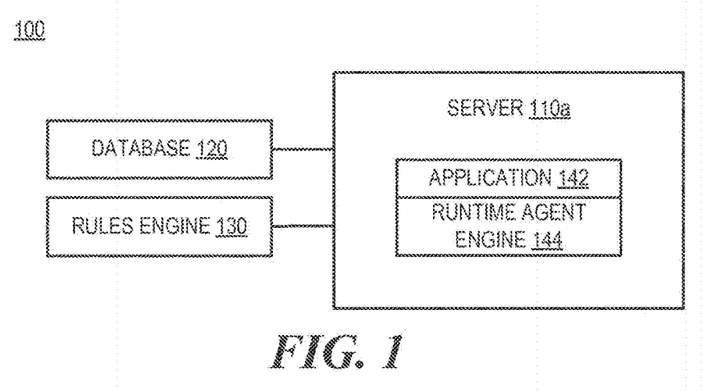
FIGS. 1 and 2 are block diagrams of a computing systems for determining and/or using a set of rules describing permissible activity of an application, according to various examples.
Figure 2:
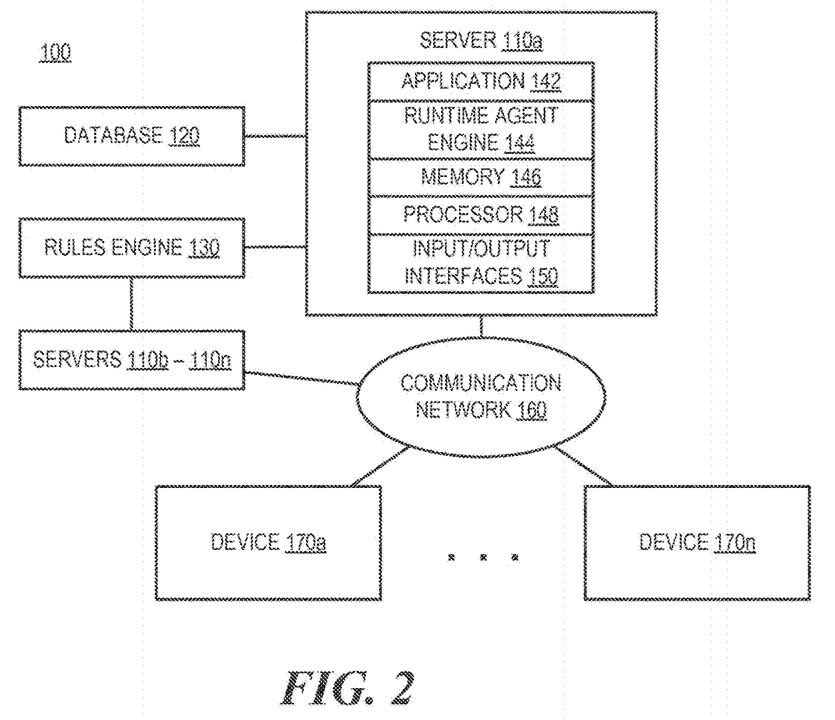

FIGS. 1 and 2 are block diagrams of a computing systems for determining and/or using a set of rules describing permissible activity of an application, according to various examples. According to FIG. 1, computing system 100 can include a server 110*a*, a database 120, and a rules engine 130. The server can include an application 142 and a runtime agent engine 144. Further, according to FIG. 2, the system 100 can further include other servers 110*b*-110*n* as well as a communication network 160 connecting the server(s) 110 to devices 170*a*-170*n*. Moreover, the server 110*a* can further include memory 146, at least one processor 148, and/or input/output interfaces 150. The respective devices 110*a*-110*n*, 170*a*-170*n* may be a notebook computer, a desktop computer, a server, a workstation, or any other computing device capable of performing the recited functionality. In certain examples, a server 140 is a system that can respond to requests over a computer network to provide or help provide a network service. Communications between devices may be conducted using a request-response protocol such as the Hyper-Text Transfer Protocol (HTTP) or other communications process. Further, the rules engine 130 and/or database 120 can be implemented as computing devices.

The server 110*a* can include the application 142. The application 142 can be used by devices 170 (e.g., clients). As noted, the application 142 can be a web application, e.g., software that can be executed by a computer in a web browser. The web application can be created in a browser-supported programming language such as JAVASCRIPT, HyperText Markup Language (HTML), Cascading Style Sheets (CSS), etc. Further, a web application framework (e.g., .NET, JavaEE, etc.) can be used to implement the web application. Examples of web applications include email applications, maps and navigation applications, banking sites, trading sites, news sites, forums, etc. The application 142 can have access to one or more database 120.

As noted, the application 142 may be encoded in any suitable Web-based computer language, such as JAVA, or .NET, among others. The application 142 may operate within a suitable software framework, such as Struts, Struts 2, ASP.NET MVC, Oracle WebLogic, and Spring MVC, or the like. The software framework includes a set of common code modules that provide generic functionality, which can be selectively overridden or specialized by user code to providing specific functionality. The application 142 may be configured to execute one or more instances of a Java Virtual Machine (JVM), Common Language Runtime (CLR), or other runtime environment. The programming instructions provided by the common code modules of the software framework or runtime environment may be referred to as container code.

The application 142 can include a network interface for enabling communications between the server(s) 110 and devices 170, database 120, and/or rules engine 130. The network interface exposes can provide access to the application 142, but also exposes an attack surface of the application 142. Communication between the application 142 and other devices over the network interface may be conducted through HTTP requests issued from the devices 170 to the application 142 and HTTP responses issued from the application 142 to the devices 170. Requests targeting the application 142 may be referred to as application requests, and responses received from the application 142 may be referred to as application responses. In some examples, communications include the communications between the application 142 and devices 170 as well as communications with other devices, for example, a database 120, other servers 110*b*-110*n*, the rules engine 130, etc.

The application 142 may be coupled to a file system, a database 120, and other resources used by the application 142. The file system may include data and programs used by the application 142, as well as data which may be requested by a user such as HTTP pages, software programs, media files, and the like.

The runtime agent engine 144 can operate within the execution environment of the application 142 and has access to the internal operations performed by the application 142. For example, the runtime agent engine 144, in certain examples, may modify the bytecode of the application 142 by injecting additional code, such as a JAVA class, at various program points. The injected code acts as a monitor that observes the application 142. The injected monitor code may be located at strategic program points in the application 142, for example, application programming interface (API) calls that perform specific operations such as reading a URL parameter, writing to the file system, performing queries, causing rendering to a web browser, etc. Whenever such a program point in the application 142 is executed, the monitor calls into services provided by the runtime agent engine 144 to record operations performed by application 142. The runtime agent engine may be coupled to a buffer for storing information that has been collected regarding the internal operations of the application 142. The buffer may be used to store data that has been collected. The buffer may be stored in non-volatile storage medium such as a hard disk, solid state drive, and the like. Information in buffers can be transmitted. For example, information collected by the runtime agent engine 144 can be sent to the rules engine 130.

The runtime agent engine 144 may also include an additional network interface for enabling communications between the runtime agent engine 144 and the rules engine 130 through the network.

Mechanisms can be used to protect the application 142, servers 110, and/or database(s) 120. One such protection can include the use of a runtime agent engine 144 to monitor the application 142 and provide dynamic protection. The runtime agent engine 144 can be configured to monitor specific types of activity. For example, the runtime agent engine 144 can monitor multiple APIs of the application 142 to generate usage information of the APIs. This can be stored in the buffer and provided to the rules engine 130 (e.g., via a network connection). In some examples, the runtime agent engine 144 can have address information for the rules engine 130 and can be configured to provide the information by accessing a component of the server (e.g., via an API of the application 142 or another approach). Further, the application can be executing on multiple servers 110 and the rules engine 130 can receive usage information from multiple application instances. The usage information can be provide over a period of time. The period of time can be an amount of time to provide a baseline amount of information about the application 142.

As noted above, one of the observations of this approach is that the application 142 will normally act in a particular way. The period of time can allow for a sample size of information to be great enough to determine the normal activity of the application 142.

The rules engine 130 can generate rules from the usage information and send the rules to the runtime agent engine 144 via an update. The rules can be generated using a machine learning approach. In one example, the rules engine 130 further partitions the usage information into a plurality of clusters, wherein the respective rules are based on the respective clusters. The rules engine 130 can be implemented on a computing device separate from the servers 110. An advantage of such an implementation is to separate the resources used for the analysis used to generate rules. Further, in some examples, the rules engine 130 can generate rules for multiple different applications. Also, in some examples, the rules engine 130 can produce rules for the same application running as instances on multiple servers.

A k-means clustering approach can be used. This approach has the benefit of finding multiple different types of activity that may be considered normal for an application and putting them into like clusters. In one example, (a) k initial "means" are sorted via a partitioning scheme (e.g., Random Partition, Forgy, etc.). In certain examples, an observation is data describing a state of particular information (e.g., time, size of a variable/parameter, complexity of a variable/parameter, which variables/parameters are used, source of a particular query, other contextual information, etc.) when a particular event (e.g., API usage) occurs. Then, (b) k clusters are generated by associating each observation with the nearest mean. Then, (c) the centroid of each of the k clusters can become the new mean. Approaches (b) and (c) can be repeated until convergence is reached. In some examples, convergence can occur when the means are within a threshold of the last iteration. In other examples, convergence occurs when the means of the iterations are identical. There are various machine learning variations of the k-means approach (e.g., k-medians clustering, Fuzzy C-Means clustering, Gaussian mixture model, etc.). Certain characteristics can be used for the observations. For example, the usage information and characteristics can include information about particular APIs such as queries to at least one database. The clusters are partitioned using k-means clustering based, at least in part, on at least one of the following characteristics: a length of the respective query, a type of characters used in the respective query, time information associated with the respective query, and complexity of syntax in the respective query, etc. In some examples, similar aspects of other APIs can be used. For example, one or more parameters can be used as observations. The characteristics can be used to set up dimensions to look into.

For a vulnerability like SQL injection or command injection, what queries look like would be important. As such, characteristics can be based around the queries. Examples include syntax of queries, length, timing information, length of special characters (e.g., symbols), etc. Timing information can be useful because some activity may occur at a particular time (e.g., a backup at 5 PM on Friday) and the activity may be considered normal at that time, but an anomaly at another time.

Density estimation can be used by the rules engine 130 to determine anomalies compared to the sample set of the clusters. In probability and statistics, density estimation is a construction of an estimate, based on observations, on the underlying probability density function. Further, a probability density function is a function that describes a likelihood that variables takes a provided value. The sample set can be assumed to be normal or non-anomalous based on the baseline data. In some examples, other controls (e.g., other security measures) can be used on the application to help ensure a normal baseline. The goal is to build a model to predict the probability that an activity (e.g., a query or use of API) is appropriate or non-anomalous. The output of the k-means clustering are groups of like data. Each of these clusters can be processed through density estimation to generate regular expressions describing the clusters based on the characteristics. Separate rules can be made for separate APIs. Further the clustering and density estimation can be done for each API monitored. For anomaly detection, model $p(x)$ can be made for each cluster. This can be converted into a regular expression. In some examples, for a particular API, each of the models for each of the clusters can be turned into regular expressions and combined by ORing the regular expressions together.

The regular expression(s) can be considered part of the set of rules. If an activity is within the model of the regular expression, the activity is considered non-anomalous. If the activity is not within the model of the regular expression, the activity can be considered anomalous. In some examples, the regular expressions can be based on a model of the $p(x)$ being less than $\varepsilon$. In some examples, the $\varepsilon$ can be determined by a user for a particular application and/or API. Moreover, the models can have levels. In one example, $p(x)<\varepsilon 1$ can signify no anomaly, while $\varepsilon 1<p(x)<\varepsilon 2$ may signify a possible anomaly and a $p(x)>\varepsilon 2$ can signify an anomaly. Regular expressions can be associated with each model range. In other examples, the model need not be transformed into a regular expression and can be processed as a steps to be performed on the characteristics monitored to determine whether it fits the respective model.

The runtime agent engine 144 can receive the rules. The rules can describe permissible activity to allow when a certain activity (e.g., API call) is performed. A rule that describes permissible activity is a rule that describes non-anomalous activity according to the usage information over a period of time. The rule can mark activity as anomalous if it does not meet parameters of the rule. In one example, the rules can be in the form of a regular expression to check for a particular API. If the activity is checked against the regular expression, it can be considered anomalous if it deviates from the norm or non-anomalous if it does not.

When a new use of one of the APIs monitored occurs, the runtime agent engine 144 can monitor the activity. The API usage can be checked against the rules. If the activity is non-anomalous, it can proceed. If the activity is deemed to be anomalous, a security action can be performed. A security action can be an action to impede and/or monitor a malicious activity. For example, the security action can be to block the API from being used, sending an error message, recording the activity, etc.

In one example, the application 142 can include a web page with an input field for a name and an input for a social security number. An API can generate a query to a database based on this information. Normal use of the application can show that the social security number field, as a variable, normally has 9 numerical digits. Further, normal use can show that the name filed, as a variable, normally has a particular range number of alphabetic characters and/or space. A model for normal use can be based on training data including the API information as processed by the clustering algorithm and further processing by density estimation. A first cluster may include 9 digits for the social security number and a single string of characters with no spaces. A second cluster may include 9 digits for social security number and two strings of characters with a space in between. A third cluster may include 9 digits for the social security number and three strings of characters a first string, a space, a second string of length 1 denoting an initial, and a third string of characters. Other such clusters may be formed as well. Density estimation can work on each cluster to model the clusters, for example, the rule may include that the social security number field only has 9 characters and the characters need to be digits, while other limitations can be formed to fit the string related to the name. Rules (e.g., regular expressions) can be made in accordance with the density estimation.

When the API is called to perform that query, the runtime agent engine 144 can compare the fields with the rule to determine whether it meets the rule. If not (e.g., because the social security number field includes an attempt to inject a script), the access attempt can be considered anomalous and thus a security action can be performed (e.g., not allowing the action to be performed, notifying an administrator, logging, etc.).

The communication network 160 can use wired communications, wireless communications, or combinations thereof. Further, the communication network 160 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 160 can be in the form of a direct network link between devices. Various communications structures and infrastructure can be utilized to implement the communication network(s).

By way of example, the devices 130, 170 communicate with each other and other components with access to the communication network 160 via a communication protocol or multiple protocols. A protocol can be a set of rules that defines how nodes of the communication network 160 interact with other nodes. Further, communications between network nodes can be implemented by exchanging discrete packets of data or sending messages. Packets can include header information associated with a protocol (e.g., information on the location of the network node(s) to contact) as well as payload information.

The engines, modules, and parts described herein can be distributed between one or more devices. The engines 142, 144, 130 include hardware and/or combinations of hardware and programming to perform functions provided herein. Moreover, modules can include programing functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine. Examples of modules and engines include the runtime agent engine 144 and rules engine 130.

A processor, such as a central processing unit (CPU) or a microprocessor suitable for retrieval and execution of instructions and/or electronic circuits can be configured to perform the functionality of any of the engines and/or modules described herein. In certain scenarios, instructions and/or other information, such as rules, can be included in memory. In some examples, input/output interfaces may additionally be provided by the devices. For example, input devices, such as a keyboard, a sensor, a touch interface, a mouse, a microphone, etc. can be utilized to receive input from an environment surrounding the devices. Further, an output device, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces.

Each of the engines/modules may include, for example, hardware devices including electronic circuitry for implementing the functionality described herein. In addition or as an alternative, each module may be implemented as a series of instructions encoded on a machine-readable storage medium of computing device and executable by a processor. It should be noted that, in some embodiments, some modules are implemented as hardware devices, while other modules are implemented as executable instructions encoded on machine-readable storage media.

Figure 3:
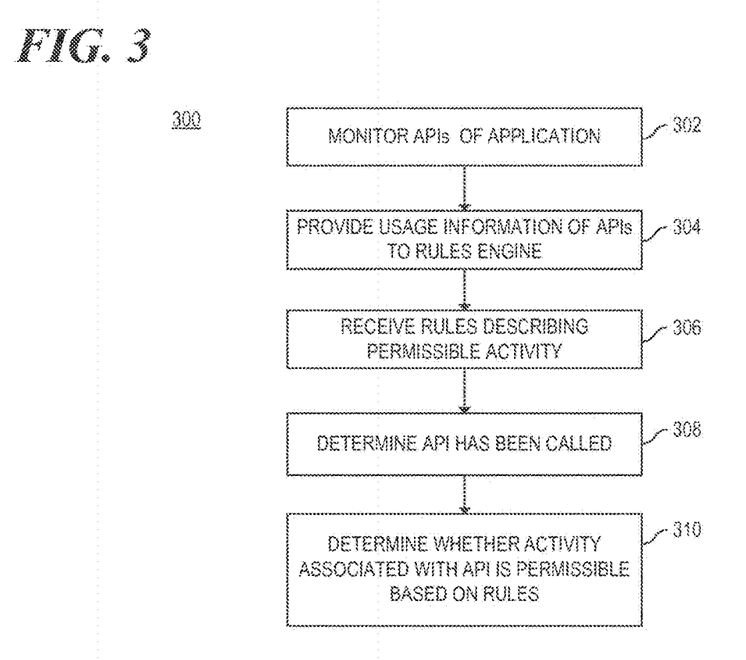
FIG. 3 is a flowchart of a method for determining and/or implementing a set of rules describing permissible activity of an application, according to one example.
Figure 4:
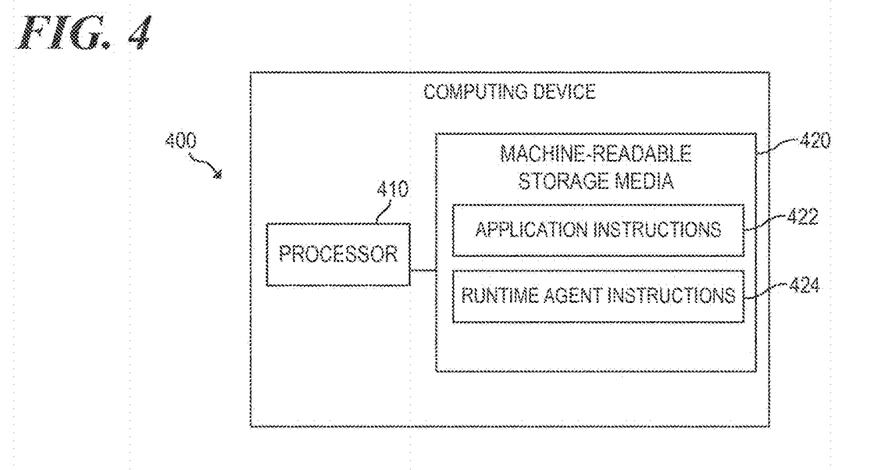
FIG. 4 is a block diagram of a computing device capable of providing seed information for and implementing a set of rules describing permissible activity of an application, according to one example.

FIG. 3 is a flowchart of a method for determining and/or implementing a set of rules describing permissible activity of an application, according to one example. FIG. 4 is a block diagram of a computing device capable of providing seed information for and implementing a set of rules describing permissible activity of an application, according to one example. Although execution of method 300 is described below with reference to computing device 400, other suitable components for execution of method 300 can be utilized (e.g., computing system 100). Additionally, the components for executing the method 300 may be spread among multiple devices. Method 300 may be implemented in the form of executable instructions stored on a machine-readable storage medium, such as storage media 420, and/or in the form of electronic circuitry.

The computing device 400 includes, for example, a processor 410, and a machine-readable storage media 420 including instructions 422, 424 for monitoring an application and protecting the application using rules. Computing device 400 may be, for example, a notebook computer, a desktop computer, a workstation, a server, or any other computing device capable of performing the functionality described herein.

Processor 410 may be, at least one central processing unit (CPU), at least one semiconductor-based microprocessor, at least one graphics processing unit (GPU), other hardware devices suitable for retrieval and execution of instructions stored in machine-readable storage media 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424 to implement method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424.

Machine-readable storage media 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage media 420 may be encoded with a series of executable instructions for protecting a web application. Further, in some examples, the various instructions 422, 424 can be stored on different media.

The computing device 400 can execute application instructions 422 to serve a web application to other devices such as clients. These clients can access the web application using software such as a web browser or local application.

At 302, the runtime agent instructions 424 can be executed to monitor APIs of the application. The runtime agent instructions 424 can be execute to implement the runtime agent. Usage information can be collected. For example, when a query is processed using a particular API, an identifier of the API and the query can be included in the usage information. In another example, the API monitored includes data to be rendered to a browser and this can be included in usage information. Monitoring these types of APIs can be used to protect against cross-site scripting (XSS). XSS is a type of vulnerability where attackers inject client-side script into web pages viewed by other users. Monitoring what is rendered can be an approach to protect from XSS.

Figure 6:
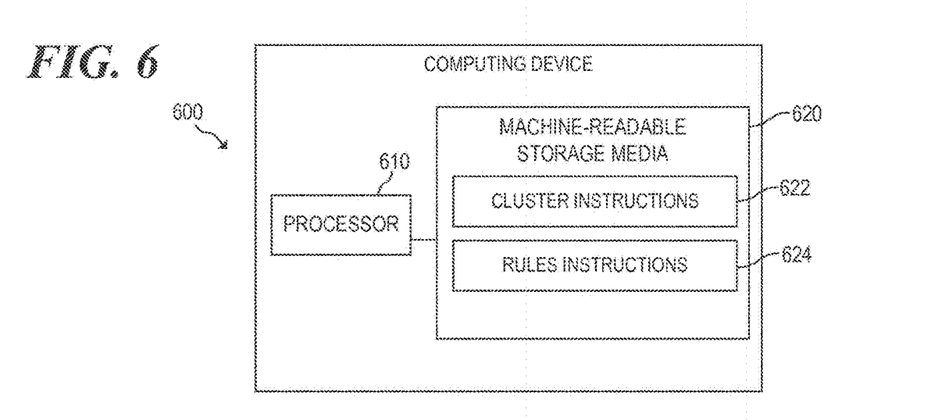
FIG. 6 is a block diagram of a computing device capable of generating a set of rules describing permissible activity of an application based on seed information from an agent monitoring the application, according to one example.

At 304, the runtime agent instructions 424 can be executed to provide the usage information over a period of time to a rules engine. In one example, the rules engine is implemented on a computing device, such as computing device 600. The providing can happen at multiple times. For example, a buffer can be filled of a first set of usage information and sent. Then a second set of usage information can be provided and so on.

The rules engine can generate rules from the provided information as detailed herein. The rules engine can send the rules to the runtime agent. At 306, the runtime agent can receive the set of rules. As noted above, the rules can describe permissible activity to allow to continue. The rules are based, at least on part, on the usage information.

The runtime agent can continue to monitor operation of the application. Further, when an API is called, the usage can be checked against the rules. The runtime agent can thus determine that one of the monitored APIs has been called (308).

At 310, the runtime agent can determine whether activity associated with the API is permissible based on the set of rules. As noted above, in one example, it can be determined whether the activity is an anomaly based on normal activity of the application (e.g., by checking against the rules or regular expressions). Examples of activity that can be monitored and checked include queries to at least one database, reads to a database, writes to a database, rendering out to a browser, etc.

Figure 5:
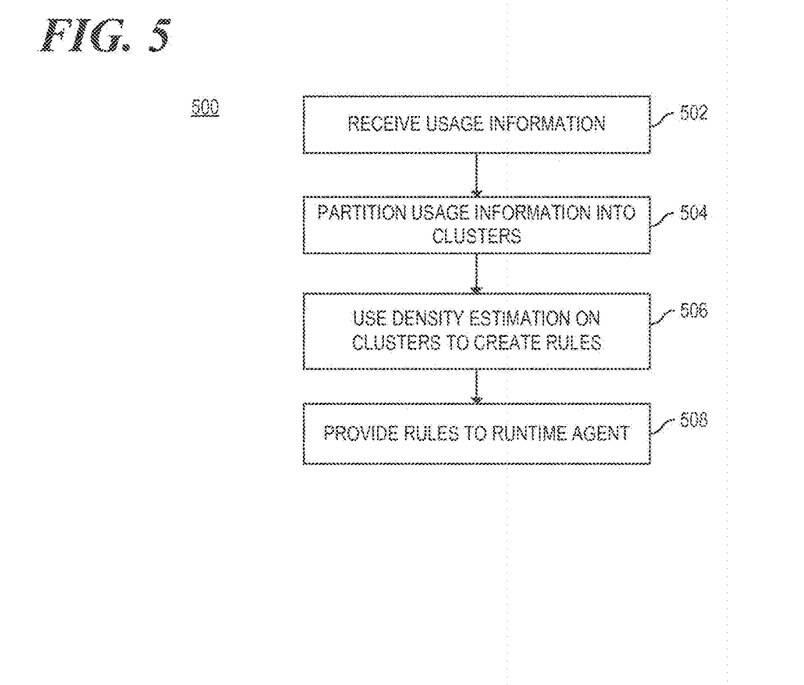
FIG. 5 is a flowchart of a method for generating rules describing permissible activity of an application, according to one example.

FIG. 5 is a flowchart of a method for generating rules describing permissible activity of an application, according to one example. FIG. 6 is a block diagram of a computing device capable of generating a set of rules describing permissible activity of an application based on seed information from an agent monitoring the application, according to one example. Although execution of method 500 is described below with reference to computing device 600, other suitable components for execution of method 500 can be utilized (e.g., computing system 100, rules engine 130, etc.). Additionally, the components for executing the method 500 may be spread among multiple devices. Method 500 may be implemented in the form of executable instructions stored on machine-readable storage media, such as storage medium 620, and/or in the form of electronic circuitry.

The computing device 600 includes, for example, a processor 610, and a machine-readable storage media 620 including instructions 622, 624 for generating rules for protecting an application. Computing device 600 may be, for example, a notebook computer, a desktop computer, a workstation, a server, or any other computing device capable of performing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage media 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624 to implement method 500. As an alternative or in addition to retrieving and executing instructions, processor 610 may include at least one integrated circuit (IC), other control logic, other electronic circuits, or combinations thereof that include a number of electronic components for performing the functionality of instructions 622, 624.

Machine-readable storage media 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage media 620 may be encoded with a series of executable instructions for performing a security test.

At 502, the computing device 600 can receive usage information. The usage information can include API data for monitored APIs of an application from one or more servers. As noted above, the API data can include information about queries, access to a database, etc.

At 504, the usage information can be partitioned into clusters. As noted above, the partitioning can be via a machine learning algorithm executed by a processor. An example of partitioning approaches include k-means clustering. As noted above, rules can be generated based on the clustering. Further, as noted above, the clustering can be based on particular characteristics from the APIs/queries such as a length of a query, types of characters in a query or parameter used in API usage, time information associated with use of the API, complexity of syntax, etc.

At 506, density estimation is used on the clusters to generate rules. In some examples, the rules can be in the form of regular expressions. As such, the set of rules can include regular expressions. These rules can be provided back to runtime agents monitoring and protecting application instances on one or more servers (508).

What is claimed is:
1. A method comprising:
monitoring, by a runtime agent executing on a server, a plurality of application programming interfaces (APIs) of an application executing on the server;
providing, by the runtime agent executing on the server, usage information over a period of time of the APIs to a rules engine;
receiving, by the runtime agent executing on the server, from the rules engine, a set of rules describing permissible activity to allow based on the usage information;
determining, by the runtime agent executing on the server, that one of the APIs has been called; and determining, by the server, whether activity associated with the one API is permissible based on the set of rules.

2. The method of claim 1, wherein the usage information includes API data for each time a monitored API is called, the method further comprising:
at the rules engine, partitioning respective API data into a cluster of a plurality of clusters, wherein the set of rules are based on the respective clusters.

3. The method of claim 2, further comprising:
using density estimation on the plurality of clusters to create regular expressions,
wherein the set of rules include the respective regular expressions.

4. The method of claim 3, further comprising:
determining whether the activity is an anomaly based on the regular expressions; and
performing a security action based on the determination of the anomaly.

5. The method of claim 2, wherein the usage information includes queries to at least one database and the activity includes another query.

6. The method of claim 5, wherein the clusters are partitioned using k-means clustering and are partitioned based, at least in part, on at least one of: a length of the respective query, a type of characters used in the respective query, time information associated with the respective query, and complexity of syntax in the respective query.

7. The method of claim 2, wherein the rules engine further receives additional usage information of the APIs of the application executing at other servers via respective runtime agents and wherein the additional usage information is used to determine the set of rules.

8. The method of claim 1, wherein the activity includes reading a file from a database.

9. The method of claim 1, wherein the usage information includes data to be rendered to a browser and the activity includes other data to be rendered in a browser.

10. A computing system comprising:
a rules engine;
a server; and
an application to execute on the server,
wherein the server comprises at least one processor and a memory, and the memory to store instructions that, when executed by the at least one processor, cause the at least one processor to:
monitor a plurality of application programming interfaces (APIs) of the application to generate usage information of the APIs;
provide the respective usage information to the rules engine over a period of time;
receive, from the rules engine, a set of rules describing permissible activity based on the provided usage information;
determine another use of one of the APIs; and
perform a security action based on whether the other use meets the set of rules.

11. The computing system of claim 10, wherein the rules engine further partitions the usage information into a plurality of clusters, wherein the respective rules are based on the respective clusters.

12. The computing system of claim 11, wherein the rules engine further uses density estimation on the respective clusters to create respective regular expressions included in the respective rules.

13. The computing system of claim 12, wherein the instructions, when executed by the at least one processor, further cause the at least one processor to determine whether the other use is an anomaly based on the respective regular expressions.

14. The computing system of claim 11, wherein the usage information includes queries to at least one database and the other use includes another query, wherein the clusters are partitioned using k-means clustering based, at least in part, on at least one of: a length of the respective query, a type of characters used in the respective query, time information associated with the respective query, and complexity of syntax in the respective query.

15. A non-transitory machine-readable storage media storing instructions that, if executed by at least one processor of a system, cause the system to:
execute a web application;
monitor a plurality of application programming interfaces (APIs) of the application using a runtime agent to determine associated queries to a database;
provide the respective queries to a rules engine over a period of time;
receive, from the rules engine, a set of rules describing permissible activity to allow to query based, at least in part, on the queries;
determine, at the runtime agent, another query to the database; and
perform a security action based on whether the query to the database meets the set of rules,
wherein the set of rules are based on k-means clustering of the respective queries into a plurality of clusters and determining respective regular expressions from the respective clusters, wherein the set of rules include the regular expressions, and
wherein the clusters are clustered based, at least in part, on at least one of: a length of the respective queries, a type of characters used in the respective queries, time information associated with the respective queries, and complexity of syntax in the respective queries.

* * * * *